Jan. 17, 1967  W. W. CEASE  3,298,565
APPARATUS FOR DISPENSING ARTICLES FROM A
STACK OF ARTICLE CARRYING UNITS
Filed Dec. 4, 1963  3 Sheets-Sheet 2

INVENTOR.
William W. Cease
BY
Christel & Bean
ATTORNEYS.

Jan. 17, 1967
W. W. CEASE
3,298,565
APPARATUS FOR DISPENSING ARTICLES FROM A
STACK OF ARTICLE CARRYING UNITS
Filed Dec. 4, 1963
3 Sheets-Sheet 3
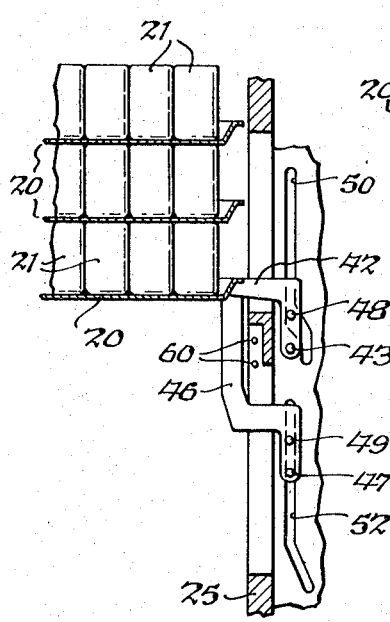
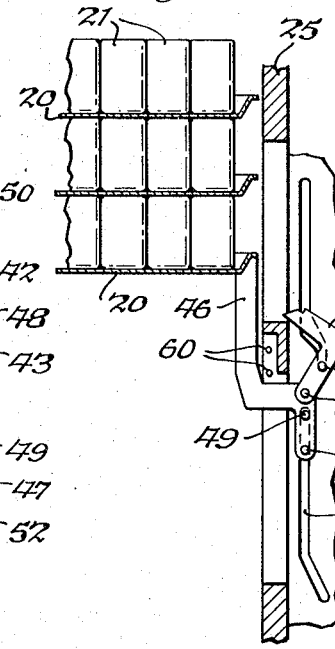
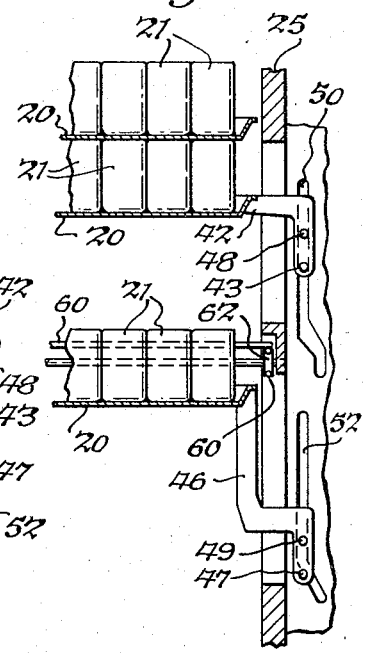
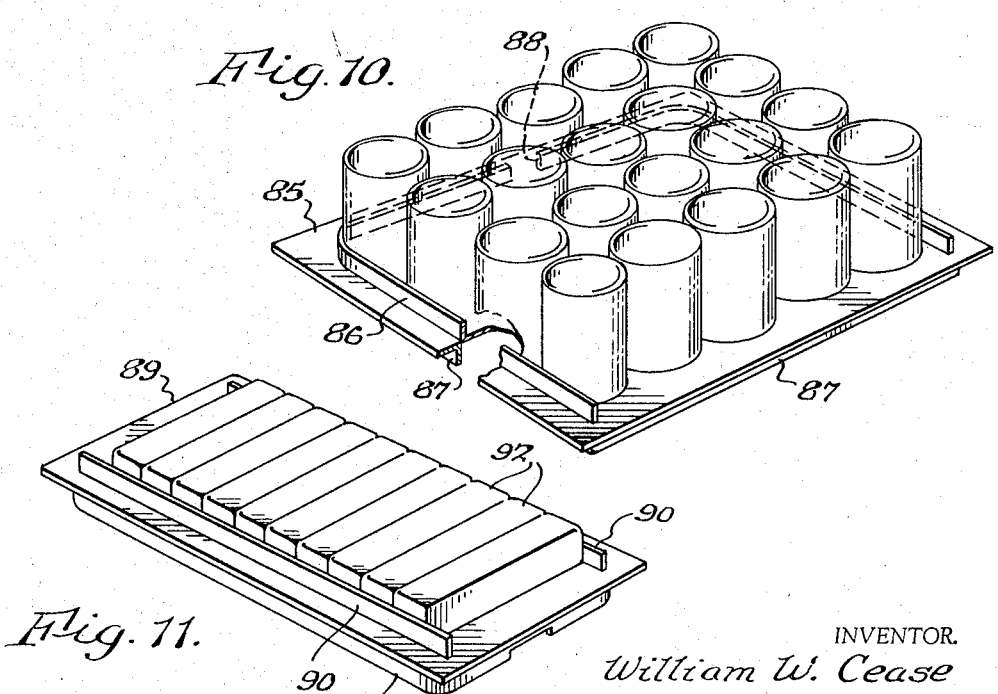
INVENTOR.
William W. Cease
BY
Christel & Bean
ATTORNEYS.

3,298,565
APPARATUS FOR DISPENSING ARTICLES FROM A STACK OF ARTICLE CARRYING UNITS
William W. Cease, Fredonia, N.Y., assignor to Cease Central, Inc., Dunkirk, N.Y.
Filed Dec. 4, 1963, Ser. No. 327,973
6 Claims. (Cl. 221—13)

This invention relates to a container dispensing apparatus for use particularly in restaurants, cafeterias, or other food dispensing operations. The dispensing principles embodied herein may also be used in other merchandising and vending fields wherein such principles may find useful application.

The apparatus of the present invention is particularly useful in dispensing cups or tumblers in cafeterias or similar self-service operations whereby the patrons may pick up an empty cup or tumbler from a supply which is issuing from a dispensing cabinet and the fill the same from an adjacent tap or other source of beverages or other liquid commodities. However, as will appear later herein, the novel apparatus of the present invention is not thus limited in its application and may be variously applied.

For instance, stacked trays each containing one or a number of articles may be dispensed by the apparatus of the present invention in connection with the construction and operation of vending machines and other mechanical means for delivering articles of various kinds.

In one typical application of the principles of the invention objects such as glasses or tumblers are placed on trays and the trays are stacked so that each tray rests on the tops of the glasses or similar articles of the tray underneath. In another application articles rest on trays but the trays are formed with downwardly projecting portions so that the trays themselves rest directly on the trays underneath. Both of the foregoing general arrangements will be clearly understood from the descriptions thereof contained in the following specification.

The present invention will be best understood from a study of the typical embodiment illustrated in the accompanying drawings and described in detail in the following specification. However, it is to be understood that the invention is not limited to the form thus set forth, nor otherwise than as defined in the appended claims.

Figure 1:
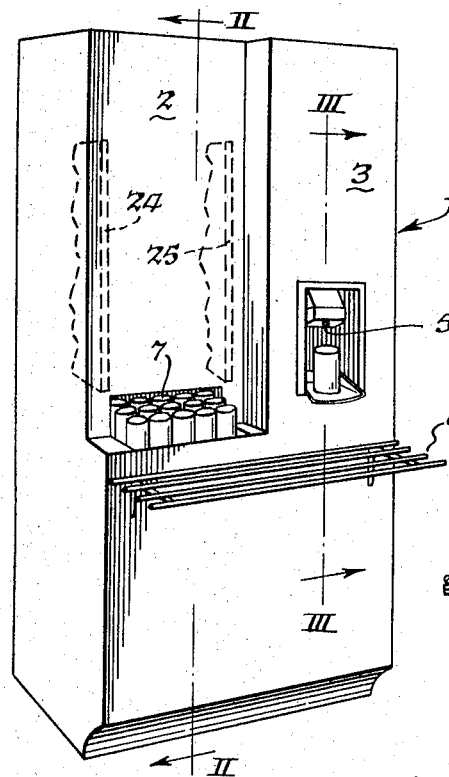
Figure 2:
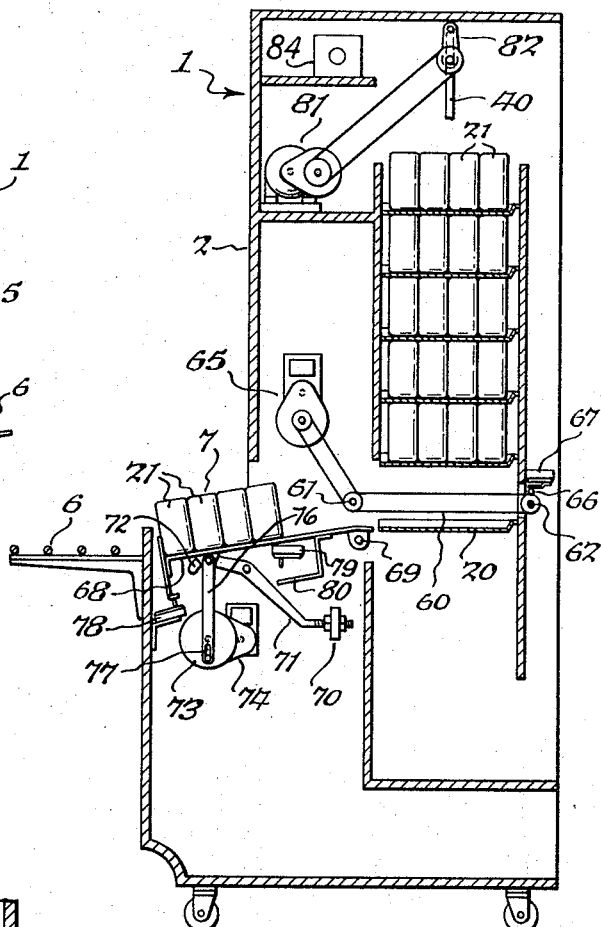
Figure 3:
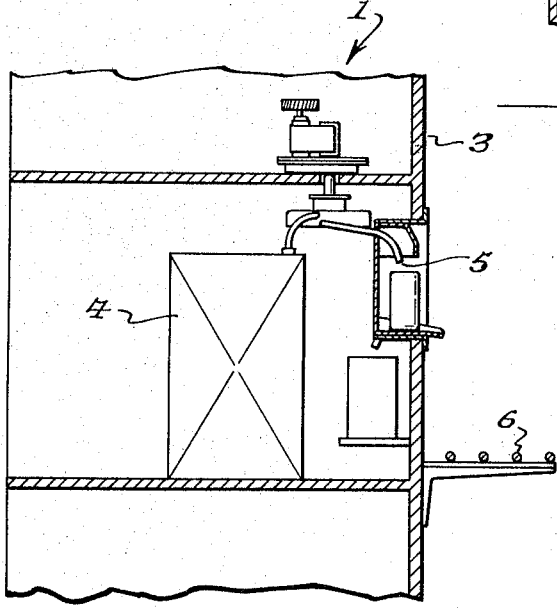
Figure 4:
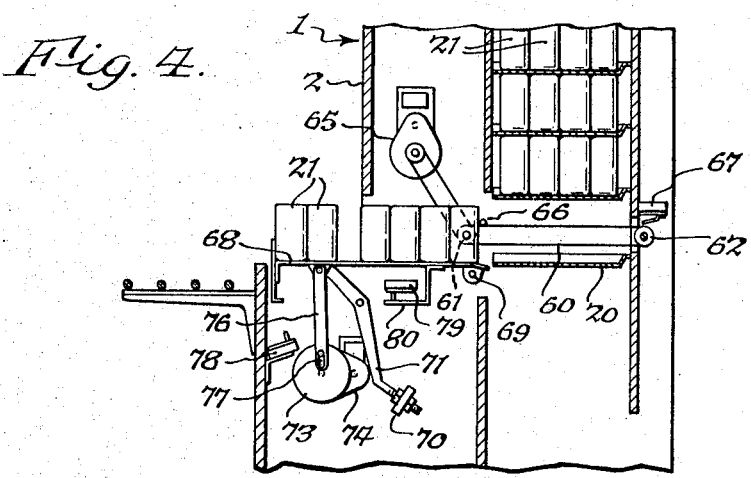
Figure 5:
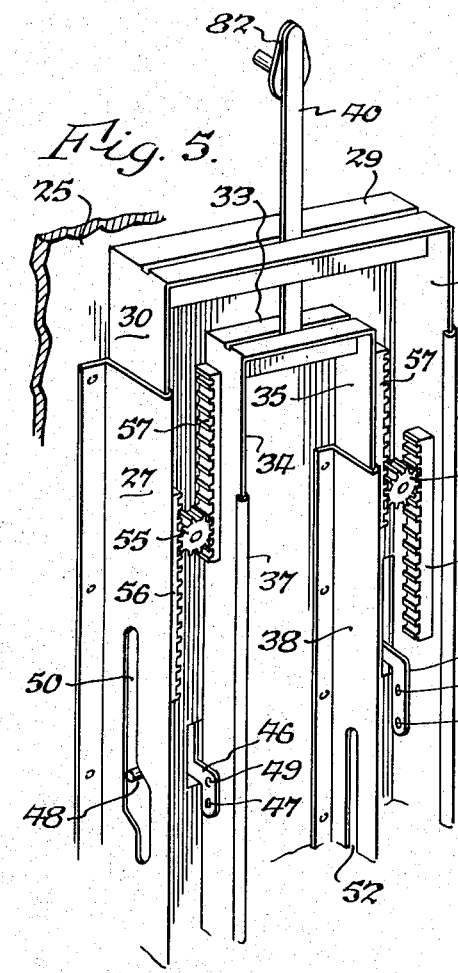
Figure 6:
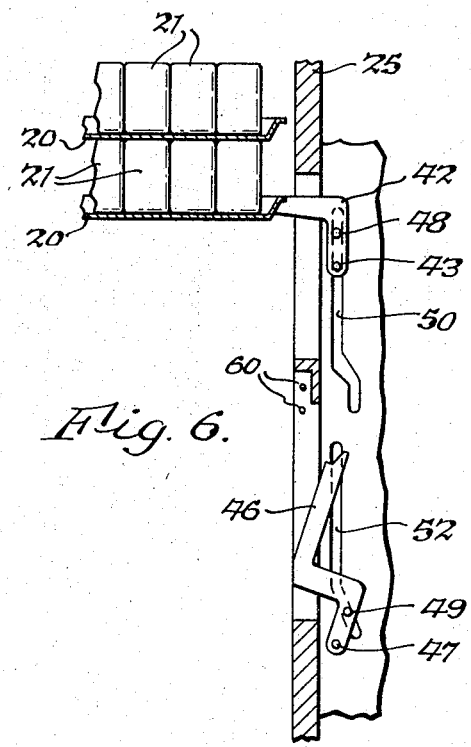

In the drawings:
FIG. 1 is a general perspective view of one form of apparatus embodying the principles of the present invention;
FIG. 2 is a vertical cross sectional view of the apparatus of FIG. 1 taken approximately on the line II—II;
FIG. 3 is a fragmentary vertical cross sectional view taken approximately on the line III—III of FIG. 1;
FIG. 4 is a fragmentary cross sectional view similar to FIG. 2 but showing a more advanced position of a portion of the dispensing apparatus;
FIG. 5 is a fragmentary perspective view of another portion of the dispensing apparatus;
FIG. 6 is a fragmentary front elevational view of the portion of the dispensing apparatus shown in FIG. 5;
FIGS. 7, 8 and 9 are views similar to FIG. 6 but each showing a later position of the parts during a dispensing cycle of this portion of the appaartus;
FIG. 10 is a perspective view of a modified tray or pallet; and
FIG. 11 is a perspective view of still another form of tray or pallet of the present invention.

Like characters of reference denote like parts throughout the several figures of the drawings. Referring particularly to FIG. 1, the numeral 1 designates generally a storage and dispensing cabinet having a compartment 2 for receiving a vertical stack of trays containing articles to be dispensed. Speaking generally, the stack is supported by the bottom tray and the stack is progressively lowered to a given dispensing level where the articles on the bottom tray are moved forwardly to a delivery zone, the empty tray is disposed of, and the next superjacent tray becomes the bottom supporting tray of the stack.

Still referring to FIG. 1, the portion of the cabinet wherein the stack of trays and articles is housed is designated 2, as indicated above. An adjacent cabinet portion 3 houses a beverage container 4 and, as shown more clearly in FIG. 3, a tap 5 for filling glasses or cups. The beverage container and dispenser is available commercially in various forms and is not novel to the present invention.

The cabinet illustrated in FIGS. 1, 2 and 3 by way of example, may be employed, for instance, in cafeteria service. Accordingly, a slide rail structure 6 extends along in front of the cabinet 1 for patrons' trays. A patron takes a tumbler or glass from the supply provided by the dispensing mechanism at the delivery zone 7 at the bottom of the portion 2 of the cabinet and fills the same from tap 5.

As shown in the drawings, the dispensing apparatus shown herein to illustrate the principles of the present invention is adapted to contain food containers which are supported on trays or pallets and in which the trays are arranged in a vertical tier separated vertically by the food containers disposed thereon. The trays are designated 20 and the containers thereon, in the present instance glasses or tumblers, are designated 21. Details of tray structures are illustrated in the drawings and will be described in greater detail later herein. For present purposes it is sufficient to state that trays 20 are conventional cafeteria type trays with the front wall removed, there being only three side walls so that articles may be slid off the front of the tray.

Reference will now be had to a novel mechanism for supporting a stack of superposed trays within the dispensing cabinet, for lowering the stack in step by step fashion, and for successively separating the bottom tray from the stack and for feeding the containers on such bottom tray to a dispensing zone or area. In this portion of the description reference will be had particularly to FIGS. 5 through 9.

Disposed within the portion or compartment 2 of a given general cabinet or casing structure are pairs of inner vertical walls 24 and 25 which extend fore and aft in the cabinet and are spaced to define an individual dispensing unit which houses a stack of trays and successively dispenses containers therefrom. One or more units may be contained in a given cabinet, the units being arranged side by side when more than one unit is provided.

Each pair of walls 24 and 25 include tray-engaging dog mechanisms which support stacks of trays and which operate to deliver individual trays from the bottom of the stack. One such mechanism is shown in FIGS. 5 through 9 and will now be described. The numeral 25 in FIGS. 6 through 9 designates a right hand wall of a stack receiving unit and a pair of vertically extending retaining flange members 27 and 28 are secured to the outer face of wall 25. An inverted U-shaped frame 29 has its legs 30 and 31 disposed between and guided for vertical sliding movement by the retaining flange members 27 and 28.

A second inverted U-shaped frame 33 is disposed within and generally in the plane of U-shaped frame 29 and has depending legs 34 and 35 retained and guided for vertical movement by retaining flange members 37 and 38 which, like the members 27 and 28, are attached to the outer face of wall 25. The legs 34 and 35 are disposed against the outer faces of flange members 37 and 38. An actuating rod 40 fixed to the upper end of frame 33 extends upwardly through a slot in frame 29 and is engaged at its upper end by mechanism for reciprocating frame 33 vertically to effect tray dispensing cycles of operation, which mechanism will presently be described.

A pair of upper lifting dogs 42 are pivoted to the inner faces of legs 30 and 31 of frame 29 as at 43 and a pair of lower lifting dogs 46 are pivoted to the outer faces of legs 34 and 35 of frame 33 as at 47. The dogs 42 and 46 carry projecting pins designated 48 and 49, respectively. The pins 48 extend through arcuate clearance slots in the legs 30 and 31 and engage cam slots 50 formed in the retaining flange members 27 and 28. Pins 49 extend through arcuate clearance slots in legs 34 and 35 and engage cam slots 52 formed in the retaining flange members 37 and 38.

The frames 29 and 33 are connected for joint but opposite vertical movement. Idler pinions 55 are rotatably mounted against wall 25 and engage rack members 56 carried by legs 30 and 31 and rack members 57 carried by legs 34 and 35. Thus downward movement of frame 33 by means of actuating rod 40 produces an equal degree of upward movement of frame 29 and vice versa.

As shown in FIG. 6, a stack consisting of trays 20 and intervening containers 21 is supported between walls 24 and 25 with the side flanges of the lowermost tray resting on dogs 42 and at this time frame 29 is in its uppermost position and frame 33 is in its lowermost position, the parts being in the opposite extreme position to that shown in the perspective view, FIG. 5. This position is used as a starting reference in describing a stack raising and lowering cycle during which the bottom tray is moved to the dispensing level, the latter level in such cycle corresponding to the condition obtaining between dispensing cycles and at the beginning of a dispensing cycle.

In this position the pins 48 of dogs 42 are in the upper ends of cam slots 50 and the dogs 42 are fully projected, whereas the pins 49 of dogs 46 are in the lower ends of cam slots 52 and the dogs 46 are in retracted position. During the first portion of the upward movement of operating rod 40 in a dispensing cycle frame 33 moves upwardly and the pins 49 of dogs 46 enter the vertical portions of slots 52 whereby dogs 46 are projected to the generally vertical positions shown in FIGS. 7 through 9. As upward movement of frame 33 and downward movement of frame 29 continues, the dogs reach the position shown in FIG. 7 wherein the dogs 46 engage the flange portions of lowermost tray 20 jointly with the dogs 42 upon which tray 20 has been supported up to this point. This transfer point is illustrated in FIG. 7.

As the dogs 46 continue upwardly they lift the lowermost tray from engagement with the dogs 42 and continued downward movement of dogs 42 brings their projecting pins 48 into the lower ends of cam slots 50 whereby dogs 42 are retracted to the positions shown in FIG. 8. In this final upward movement of frame 33 the dogs 46 raise the stack slightly in completing the transfer process, thus bringing the frames 29 and 33 to their extreme lower and upper positions, respectively, at which point the dogs 42 and 46 occupy the positions illustrated in FIG. 8.

At this point in a dispensing cycle the operating rod 40 reverses its direction of vertical movement and begins to move downwardly from the position illustrated in FIG. 5, whereupon the dogs 46 move downwardly to lower the stack of trays and containers now supported thereby and the dogs 42 commence their upward movement in the retracted position shown in FIG. 8.

In this upward movement the dogs 42 again become projected by engagement of their pins 48 in cam slots 50 but it is to be noted that the angular portions of cam slots 50 are so formed that their upper camming surfaces are spaced upwardly from their lower camming surfaces sufficiently so that the re-projection of dogs 42 occurs later in the upward cycle than their retraction occurred during the downward movement.

Until they are forcibly re-projected by operation of the cam slots 50 the dogs 42 remain in the retracted position shown in FIG. 8 by the force of gravity.

The proportions of the parts and the shape of the cam slots 50 are such that the dogs 42 become re-projected after they are above the elevation of the tray 20 which is being directly supported by the dogs 46 at this time. Accordingly, the dogs 42 are fully re-projected after they have moved upwardly beyond such lowermost tray but before they have reached the elevation of the next tray above.

Therefore, as upward movement of the dogs 42 continues, accompanied by downward movement of the dogs 46 and the stacks supported thereby, the dogs 42 engage the flanges of the next tray in the stack and thus elevate the stack from the bottom tray 20 (which is resting on dogs 46) and the containers 21 on such bottom tray.

At this point the containers 21 or other articles on bottom tray 20 are ready to be moved from the tray to a position forwardly thereof and accordingly the mechanism dwells in this position during a cycle of operation of the mechanism which moves the articles 21 forwardly, which mechanism will presently be described. This position of the dogs 42 and 46 is the rest position, that is, the position of the mechanism between cycles of operation. After this dwell period and after a subsequent dispensing cycle has begun the mechanism of FIGS. 5 through 9 continues to the end position shown in FIG. 6 where dogs 46 are retracted and the now empty tray 20 falls to a disposal chamber in the bottom of the cabinet.

Reference will now be had to the mechanism for thus moving the containers 21 forwardly from tray 20 and for receiving and subsequently handling the containers to render them readily available to patrons or other users and to insure a continuous supply by providing for automatic replenishment of the containers at the point where they are taken up by patrons or other users. This portion of the dispensing apparatus is particularly applicable to the operation of beverage dispensing which is described herein by way of example and other or modified means may be employed in moving articles from the trays in other applications of the tray supporting and tray lowering mechanism described above.

Referring to FIGS. 2 and 4, a pair of cables 60 extend about front and rear pairs of pulleys 61 and 62 at opposite sides of compartment 2 and are adapted to be synchronously driven by a drive motor 65 which includes reducing gear mechanism. An ejecting bar 66 extends across and connects with cables 60 so that it is movable forwardly as shown in FIG. 4 to push containers 21 from tray 20 and then, by continued forward operation of motor 65, to return to a rearward position as sown in FIG. 2.

A limit switch 67 is located adjacent to the rearward position of ejecting bar 66 so as to be engaged by the latter upon the termination of the retracting movement of ejecting bar 66. The function and purpose of limit switch 67 will presently appear.

A shelf or platform for receiving containers 21 as they are moved forwardly from tray 20 is shown at 68 in FIGS. 2 and 4. Shelf 68 is pivoted as at 69 and is biased to an upper position by a counterweight 70 carried by a lever 71 which bears against the bottom of shelf 68 through nose portion 72 (best shown in FIG. 2) and tends to raise the same. Shelf 68 is shown in its lowermost position in FIG. 2 and in its raised horizontal position in FIG. 4.

The means for positively effecting major raising and lowering pivoting movements of shelf 68 will now be described. A crank wheel 73 is adapted to be driven by a geared motor 74 and a link 76 is pivoted at its upper end to the underside of shelf 68 and has pin and slot connection with crank wheel 73 as at 77. A limit switch 78 is adapted to be engaged by a lower portion of shelf 68 but only when the latter is in its lowermost position and a further limit switch 79 is adapted to be engaged by an operating member 80 on shelf 68 when shelf 68 reaches its upper horizontal limit position as shown in FIG. 4.

The operation of the foregoing dispensing apparatus is under the general control of a multiple rotary cam timer commonly known in the electro-mechanical arts as a programming cam timer, the operation of which is initiated by upward movement of shelf 68. Such timers are commonly used in the machine arts to produce a timed sequence of operations. The device employed in applicant's specific reduction to practice of the present dispensing machine is purchased from Industrial Timer Corporation of Parsippany, New Jersey but equivalent multiple rotary cam programming timers are commercially available from numerous manufacturers and their use and adaptation to particular requirements is well known to those versed in the machine art. In the present instance the programming timer includes four cams mounted on a single shaft for joint rotation through a 360° cycle of timing operation by a cam drive motor which is conventionally included in the programming cam timer assembly. Micro-switches are arranged and the cams of the timer are adjusted so that the switches are opened and closed by the several cams at desired points in a cycle of operation, in the usual manner, to produce a desired sequence of timed operations. A programming timer is shown schematically at 84 in FIG. 2.

FIG. 2 shows shelf 68 in a lowermost position with four rows of glasses 21 thereon. The counterweight 70 is adjusted so that when the glasses are reduced to two rows the shelf 68 pivots upwardly an amount permitted by the pin and slot connection 77 which actuates switch 78 and causes the motor of the programming timer to commence rotation. The first cam of the timer then causes motor 74 to rotate and to discontinue rotation when crank gear 73 has made a one-half rotation, raising shelf 68 to the level position shown in FIG. 4. The limit switch 79 is opened by bracket 80 when the shelf reaches it upper position, whereby motor 74 stops precisely at the point where shelf 68 has reached its horizontal position. This is merely a safety device which provides greater accuracy of stoppage than if the first cam of the timer were alone relied upon to stop motor 74.

The second cam of the timer then energizes motor 65 to move ejection bar 66 forwardly to push the four rows of glasses on tray 20 onto shelf 68 which then contains six rows of glasses. Motor 65 continues its rotation to return the ejection bar 66 and as a safety provision microswitch 67 breaks the ejection motor circuit when bar 66 is fully returned, again superseding the second cam of the timer to achieve greater accuracy in the stoppage of bar 66.

The switches associated with the third cam of the programming timer then actuate motor 74 to produce another one-half rotation of crank gear 73 to lower shelf 68 to the position shown in FIG. 2.

The fourth cam of the timer controls the operation of a motor shown at 81 in the upper portion of cabinet 1 in FIG. 2 which rotates a crank designated 82 in FIGS. 2 and 5 to produce a cycle of raising and lowering movement of rod 40 which drops the tray which has now been emptied from the dispensing level and lowers the next tray to the dispensing level in the manner described previously herein. This operation may be timed to occur wholly or partly during the shelf lowering operation described in the preceding paragraph. Upon completion of the cycle of operation of rod 40 dogs 42 and 46 have operated to present a full tray at the dispensing level ready for forward ejection of the articles from the tray. Upon completion of the foregoing sequence of operations under control of the four cams of the timer the timer has completed 360° of operation and automatically stops until a subsequent cycle of timer operation is initiated by operation of switch 78.

As indicated earlier herein, the dispensing principles of the present invention may be applied to various dispensing and vending problems, in addition to the beverage container dispensing operation which is illustrated and described in detail herein. FIGS. 10 and 11 of the drawings show other forms of trays or pallet devices for dispensing a variety of articles.

FIG. 10 shows a tray or pallet 85 specially constructed to hold glasses or cups of a given size and number. Pallet 85 comprises a flat panel body portion having a rim 86 extending about three sides of its top surface and a flange 87 extending about four sides of its bottom surface. The bottom flange 87 is proportioned to fit about the rim 86 when no glasses are present, whereby a secure stack of pallets 85 may be formed. Further, the flange 87 fits over the tops of glasses or other containers on an underlying pallet or tray to retain them on such underlying tray and facilitate secure stacking of a number of trays and intervening glasses or other containers. Rim 86 may be notched as shown at 88 to facilitate strapping a number of pallets and glasses in a secure stack for transportation and handling, in the general manner shown in FIG. 12 of my prior co-pending application, Serial No. 287,121 filed June 11, 1963, and the lower flanges 87 may be similarly notched.

FIG. 11 shows a pallet somewhat similar to that of FIG. 10 but for use in dispensing individual articles in a vending or similar operation wherein the articles are housed between interfitting pallets. In FIG. 11 the main body of the pallet comprises a flat panel 89 having parallel upstanding retaining rails 90 at two sides of its upper surface and a flange 91 extending about its bottom surface. Flange 91 fits over the rails 90 of an underlying pallet and the lower edges of flange 91 seat against the upper surface of the panel 89 of the underlying pallet to completely enclose the articles 92 on such underlying pallet.

Thus the articles are protected against crushing or other injury. The articles on the pallet 89 may comprise candy bars, for instance, and the pallet stack lowering mechanism may be as described in conjunction with FIGS. 5 through 9. Here again the stacks of pallets may be strapped for secure transportation and handling, as mentioned above.

I claim:

1. Apparatus for supporting a stack of article carrying units and dispensing articles from individual units from the bottom of said stack, comprising means for engaging the lowermost unit of said stack and movable downwardly to present said lowermost unit at a dispensing level, means movable to engage the next superjacent unit and raise the remaining stack from said lowermost unit while the latter is supported at said dispensing level by said downwardly movable means, means operable to move articles horizontally from said lowermost unit to dispense the same, means operative to retract said first mentioned means to release said lowermost unit after said articles have been moved therefrom, and timing means operable upon initiation of a dispensing cycle for operating said four means in sequentially timed relation.

2. Apparatus as in claim 1 wherein a shelf is disposed adjacent to said dispensing level for receiving articles moved from said lowermost unit, and weight responsive means operable when the weight of articles on said shelf falls below a predetermined minimum to actuate said timing means to initiate a dispensing cycle.

3. Apparatus for supporting a stack of article carrying units and dispensing articles from individual units from the bottom of said stack, comprising means for engaging the lowermost unit of said stack and movable downwardly to present said lowermost unit at a dispensing level, means movable to engage the next superjacent unit and raise the remaining stack from said lowermost unit while the latter is supported at said dispensing level by said downwardly movable means, a shelf disposed adjacent to said lowermost unit at the dispensing level, weight responsive means operative when the weight of the number of articles on said shelf falls below a predetermined minimum, means actuated by said weight responsive means to move articles horizontally from said lowermost unit to said shelf, and timing means operable upon initiation of a dispensing cycle for operating said first two mentioned means in sequentially timed relation with respect to said last-mentioned means.

4. Apparatus for supporting a stack of article carrying units and dispensing articles from individual units from the bottom of said stack, comprising first means at opposite sides of a stack adapted to engage the side edges of the lowermost unit of a stack and thus support the stack, second means at opposite sides of said stack likewise adapted to engage the side edges of the lowermost unit of such stack, means for reciprocating said first and second means in opposite directions with their paths of movement meeting upon lowering movement of said first means and raising movement of said second means whereby said second means engages said lowermost unit and raises the stack from said first means, means for retracting the first means adjacent to its lower limit of movement after said stack is supported by said second means, said last mentioned means being actuable upon subsequent upward movement of the first means for projecting the same after such means has moved about said lowermost unit to engage the next lowermost unit and thus raise the remaining stack from such lowermost unit, means for dispensing articles from said lowermost unit after such raising of the remaining stack, and means for retracting said second means for releasing the unit supported thereby.

5. Apparatus for supporting a stack of article carrying units and dispensing articles from individual units from the bottom of said stack, comprising first arm means at opposite sides of a stack adapted to engage the side edges of the lowermost unit of a stack and thus support the stack, second arm means at opposite sides of said stack likewise adapted to engage the side edges of the lowermost unit of such stack, means for reciprocating said first and second arm means in opposite directions with their paths of movement meeting when the first arm means is in a lowered position and the second arm means is in a raised position whereby said second arm means engages said lowermost unit and raises the stack from said first arm means, means for retracting the first arm means adjacent to its lower limit of movement after said stack is supported by the second arm means, said last mentioned means being actuable upon subsequent upward movement of the first arm means for projecting the same after such arms means has moved above said lowermost unit to engage the next lowermost unit and thus raise the remaining stack from such lowermost unit, means for dispensing articles from said lowermost unit after such raising of the remaining stack, and means for retracting said second arm means at the lower portion of its range of movement for releasing the unit supported thereby.

6. In a dispensing apparatus, means for supporting a vertical stack of trays each containing one or more articles to be dispensed, means for separating the bottom tray from said stack to present said bottom tray at a dispensing station, means movable substantially horizontally for pushing articles from said tray at said dispensing station, a shelf adjacent to the tray at said dispensing station for receiving articles pushed thereonto from said tray, means sensitive to the weight of the number of articles on said shelf and operative when such number of articles falls below a predetermined number for actuating said horizontally movable means.

References Cited by the Examiner
UNITED STATES PATENTS

| | | |
|---|---|---|
| 1,330,639 | 2/1920 | Leumann. |
| 1,355,488 | 10/1920 | McKenney _____ 221—22 X |
| 1,649,365 | 11/1927 | Poling et al. _____ 221—89 X |
| 1,992,761 | 2/1935 | Neumair _____ 221—13 |
| 2,071,770 | 2/1937 | Shield. |
| 2,719,651 | 10/1955 | Gabrielsen _____ 221—115 X |
| 2,834,510 | 5/1958 | Cenotti _____ 221—88 X |
| 2,885,111 | 5/1959 | Vann et al. _____ 221—13 |
| 3,043,476 | 7/1962 | Zwarycz _____ 221—221 |
| 3,112,023 | 11/1963 | Mumma _____ 221—221 X |

FOREIGN PATENTS 544,575  6/1956  Italy.

ROBERT B. REEVES, *Primary Examiner.*
KENNETH N. LEIMER, *Examiner.*